US007372975B2

(12) United States Patent
Avidan et al.

(10) Patent No.: US 7,372,975 B2
(45) Date of Patent: May 13, 2008

(54) METHOD FOR SECURE BACKGROUND MODELING IN IMAGES

(75) Inventors: Shmuel Avidan, Brookline, MA (US); Moshe Butman, Petah-tikva (IL); Ayelet Butman, Petah-tikva (IL)

(73) Assignee: Mitsubishi Electric Research Laboratory, Inc., Cambridge, MA (US)

( * ) Notice: Subject to any disclaimer, the term of this patent is extended or adjusted under 35 U.S.C. 154(b) by 700 days.

(21) Appl. No.: 11/005,574

(22) Filed: Dec. 6, 2004

(65) Prior Publication Data

US 2006/0120619 A1 Jun. 8, 2006

(51) Int. Cl.
*G06K 9/00* (2006.01)

(52) U.S. Cl. ........................................ 382/100; 382/168

(58) Field of Classification Search ................ 382/100, 382/168, 107, 284; 380/210; 713/168, 189
See application file for complete search history.

(56) References Cited

U.S. PATENT DOCUMENTS 5,815,572 A * 9/1998 Hobbs ........................ 380/215
6,957,341 B2 * 10/2005 Rice et al. .................. 713/190
7,133,185 B2 * 11/2006 Wen et al. .................. 359/298
2004/0151342 A1 8/2004 Venetianer et al.

FOREIGN PATENT DOCUMENTS

WO WO 2004/052035 6/2004

OTHER PUBLICATIONS

Y.C. Chang and C.J. Lu, "*Oblivious Polynomial Evaluation and Oblivious Neural Learning*," In Advances in Cryptology, Asiacrypt '01, Lecture Notes in Computer Science vol. 2248, pp. 369-384, 2001.

C. Clifton, M. Kantarciougly, J. Vaidya, X. Lin, and M. Zhu, "*Tools for Privacy Preserving Distributed Data Mining*," In SIGKDD Explorations, 4(2):28-34, 2002.

D. Koller, M. Turitzin, M. Levoy, M. Tarini, G. Croccia, P. Cignoni, and R. Scopingno, "*Protected Interactive 3D Graphics Via Remote Rendering*," In SIGGRAPH 2004.

Y. Lindell and B. Pinkas, "*Privacy Preserving Data Mining*," In Advances in Cryptology—Crypto 2000, LNCS 1880, 2000.

M. Naor and B. Pinkas, "*Oblivious Polynomial Evaluation*," In Proceedings of the 31st Symposium on Theory of Computer Science (STOC), Atlanta, GA, pp. 245-254, May 1-4, 1999.

(Continued)

*Primary Examiner*—Phuoc Tran
(74) *Attorney, Agent, or Firm*—Dirk Brinkman; Clifton D. Mueller; Gene V. Vinokur

(57) ABSTRACT

A method processes a sequence of input images securely. A sequence of input images are acquired in a client. Pixels in each input image are permuted randomly according to a permutation $\pi$ to generate a permuted image for each input image. Each permuted image is transferred to a server, which maintains a background image from the permuted images. In the server, each permuted image is combined with the background image to generate a corresponding permuted motion image for each permuted image. Each permuted motion image is transferred to the client and the pixels in each permuted motion image are reordered according to an inverse permutation $\pi^{-1}$ to recover a corresponding motion image for each input image.

15 Claims, 13 Drawing Sheets

OTHER PUBLICATIONS

S. Romdhani, P. Torr, B. Scholkopf, and A. Blake, "*Computationally Efficient Face Detection*," In International Conference on Computer Vision, Vancouver, 2001.

C. Stauffer and E. Grimson, "*Learning Patterns of Activity Using Real-Time Tracking*," PAMI, 22(8):747-757, 2000.

P. Viola and M. Jones, "*Rapid Object Detection Using a Boosted Cascade of Simple Features*," in IEEE Conference on Computer Vision and Pattern Recognition, Hawaii, 2001.

W. Du and M. Atalla, "*Privacy-preserving cooperative scientific computations*," In 14th IEEE Computer Security Foundations Workshop, pp. 273-282, Nova Scotia, Canada, Jun. 11-13, 2001.

* cited by examiner

100

101

200

METHOD FOR SECURE BACKGROUND MODELING IN IMAGES

FIELD OF THE INVENTION

This invention relates generally to computer vision, and more particularly to secure multi-party processing of images and videos.

BACKGROUND OF THE INVENTION

With the availability of global communication networks, it is now common to 'outsource' some data processing tasks to external entities for a number of reasons. For example, the processing can be done at a reduced cost, or the external entity has better computational resources or better technologies.

One concern of outsourcing data processing is the inappropriate use of confidential information by the other entities. For example, it is desired to have an external entity process a large number of surveillance videos, or confidential scanned documents without having the external entity learn the content of the videos or documents. In another application, it is desired to perform complex analysis on images acquired by a cellular telephone with limited power and computational resources.

For such applications, conventional cryptography protects only the data during transport, and not the processing by another entity. One could resort to zero-knowledge techniques. However, zero-knowledge techniques are known to be computationally intensive. Applying such techniques to large data sets, such as images and video streams is impractical for low-complexity devices. For example, a single high-resolution image includes millions of bytes, for a video the images can occur at a rate of thirty frames per second or higher.

Zero-knowledge or secure multi-party computation was first described by Yao, "How to generate and exchange secrets," Proceedings of the 27th IEEE Symposium on Foundations of Computer Science, pp. 162-167, 1986, for a specific problem. Later, that zero-knowledge technique was extended to other problems, Goldreich et al., "How to play any mental game—a completeness theorem for protocols with honest majority," 19th ACM Symposium on the Theory of Computing, pp 218-229, 1987. However, those theoretical constructs were still too demanding to be of any practical use.

Since then, many secured methods have been described, Chang et al., "Oblivious Polynomial Evaluation and Oblivious Neural Learning," Advances in Cryptology, Asiacrypt '01, Lecture Notes in Computer Science Vol. 2248, pages 369-384, 2001, Clifton et al., "Tools for Privacy Preserving Distributed Data Mining," SIGKDD Explorations, 4(2):28-34, 2002, Koller et al., "Protected Interactive 3D Graphics Via Remote Rendering," SIGGRAPH 2004, Lindell et al., "Privacy preserving data mining," Advances in Cryptology—Crypto 2000, LNCS 1880, 2000, Naor et al., "Oblivious Polynomial Evaluation," Proc. of the 31st Symp. on Theory of Computer Science (STOC), pp. 245-254, May 1, 999, and Du et al., "Privacy-preserving cooperative scientific computations," 4th IEEE Computer Security Foundations Workshop, pp. 273-282, Jun. 11, 2001. A full treatment of the problem can be found in the reference text book by Goldreich, *Foundations of Cryptography*, Cambridge University Press, 1998.

Secure multi-party computations are often analyzed for correctness, security, and overhead. Correctness measures how close a secure process approaches an ideal solution. Security measures the amount of information that can be gained from the multi-party exchange. Overhead is a measure of complexity and efficiency.

It is desired to provided for the secure processing of images and videos acquired by a client computer using a server computer. Furthermore, it is desired to minimize the computational resources required at the client computer.

SUMMARY OF THE INVENTION

The invention provides a system and method for processing images and videos generated by a client computer, without revealing the content of the images to the processes of a server computer. Furthermore, it is desired to keep the processing technique of the server computer secure from the client computer.

The invention applies zero-knowledge techniques to solve vision problems. That is, the computer vision processing is 'blind' to the processed images. Thus, the method that operates on the images learns nothing about the content of the images or the results of the processing. The method can be used to perform secure processing of surveillance videos, e.g., background modeling, object detection, and face recognition.

More particularly, the invention provides a method for processing a sequence of input images securely. A sequence of input images are acquired in a client. Pixels in each input image are permuted randomly according to a permutation $\pi$ to generate a permuted image for each input image. Each permuted image is transferred to a server, which maintains a background image from the permuted images. In the server, each permuted image is combined with the background image to generate a corresponding permuted motion image for each permuted image. Each permuted motion image is transferred to the client and the pixels in each permuted motion image are reordered according to an inverse permutation $\pi^{-1}$ to recover a corresponding motion image for each input image.

DETAILED DESCRIPTION OF THE PREFERRED EMBODIMENT

System Overview

Figure 1A:
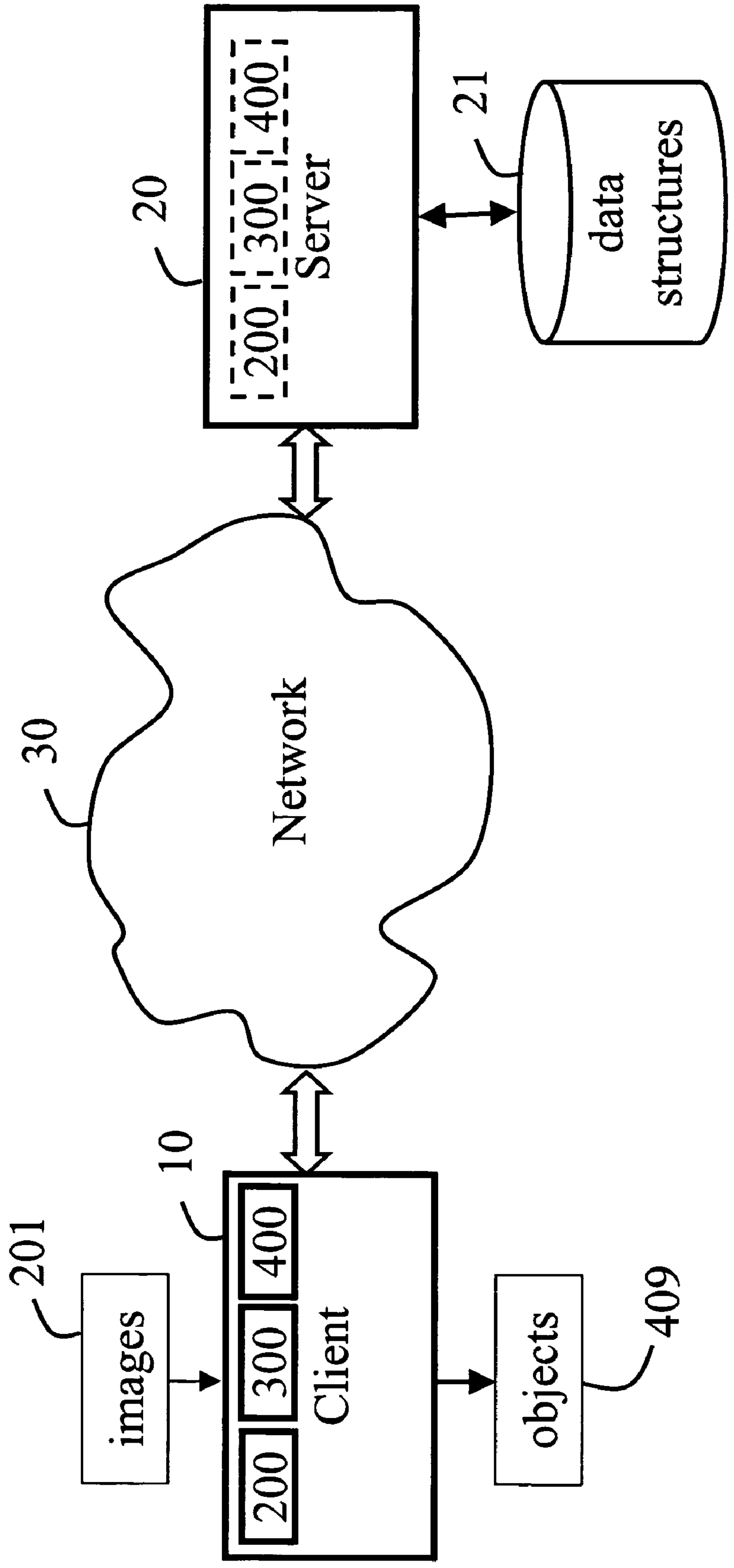
FIG. 1A is a block diagram of a system for processing images securely according to the invention.

As shown in FIG. 1A, a system 100 for securely processing images is described with respect to an example security application. In the system 100, a client computer (client) 10 is connected to a server computer (server) 20 via a network 30. As an advantaged, the client 10 can have limited processing and power resources, e.g., a laptop, a low-cost sensor, or a cellular telephone.

The client acquires a sequence of images 201, i.e., a 'secret' video. The images 201 are processed using processes 200, 300, and 400. In a cooperative manner, the processes operate partially on the client computer as indicated by solid lines, and partially on the server computer as indicated by dashed lines. This is known as multi-party processing. The processes operate in such a way that the contents of the images 201 are not revealed to the server, and the server processes and data 21 are not revealed to the client.

The client can use results of the multi-party processing to detect 'secret' objects in the images 201. At the same time, the client is prevented from learning the 'secret' portions of the processes 200, 300, and 400 performed partially by the server and the secret data structures 21 maintained by the server.

The processing is secure because the underlying content of the images is not revealed to the processes operating on the images in the server. Thus, the input images 201 can be acquired by a simple client computer while the secure processing is performed by a more sophisticated server computer. The results of the processing are meaningless to the server. Only the client can recover the 'secret' processed result. Hence, the invention provides 'blind' computer vision processing.

Figure 1B:
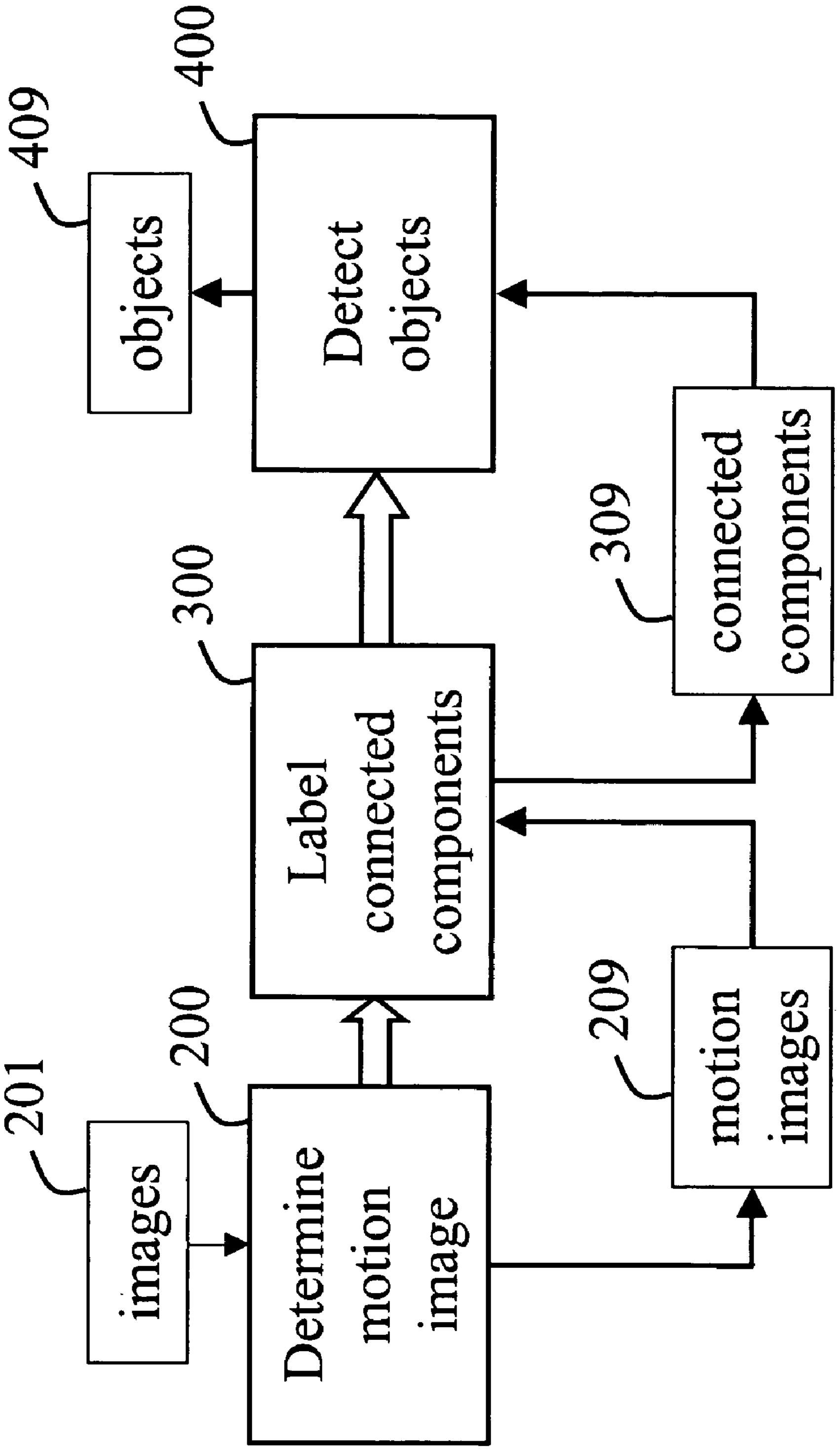
FIG. 1B is a flow diagram of a method for processing images securely according to the invention.

As shown in FIG. 1B, the method 101 includes three basic processes 200, 300, and 400. First, the video 201, i.e., a temporal sequence of images, is processed to determine 200 motion images 209. The motion images include only moving components in the video. The moving components are sometimes known as 'foreground', and the remaining components are termed the stationary 'background' model. Second, the motion images can be further processed to label 300 connected foreground components 309. Third, the connected components can be processed to detect 400 objects 409. It should be noted that the input images to processes 200, 300, and 400 can be different. That is, each process can be performed independent of any prior processing or subsequent processing. For example, the object detection can be performed on any type input image.

The method, in its entirety, can also be considered a data reduction or 'triage', with increasingly more complex processing on a smaller set of data. The initial step 200, which operates on a full range of intensities of all pixels in the video, is extremely simple and fast. The middle step 300, although a little more complex, operates mostly on a small set of tiles storing binary values, zeros and ones, which is a much smaller data set. The final step uses more complex operations, but only has to deal with very small portions of the original image content. Thus, the invention applies very simple techniques to vary large data sets to drastically reduce the amount of data that needs to be processed, while a more complex treatment is reserved for very small data sets during the triage.

Blind Motion Images

Figure 2A:
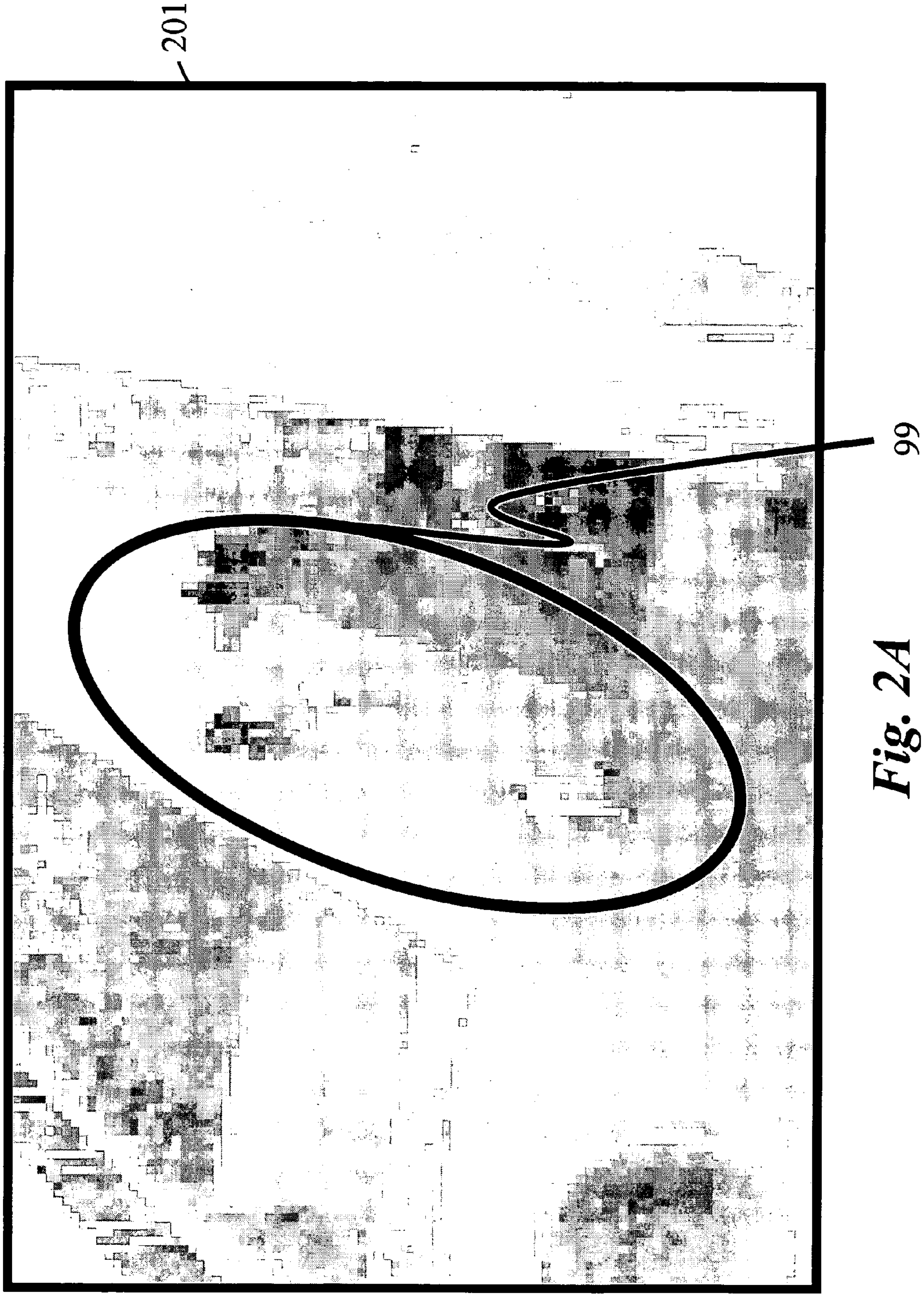
FIG. 2A is an image to be processed according to the invention.

FIG. 2A shows an example input image 201 of a 'secret' video. The example video is of a street scene with a group of pedestrians 99.

Figure 2B:
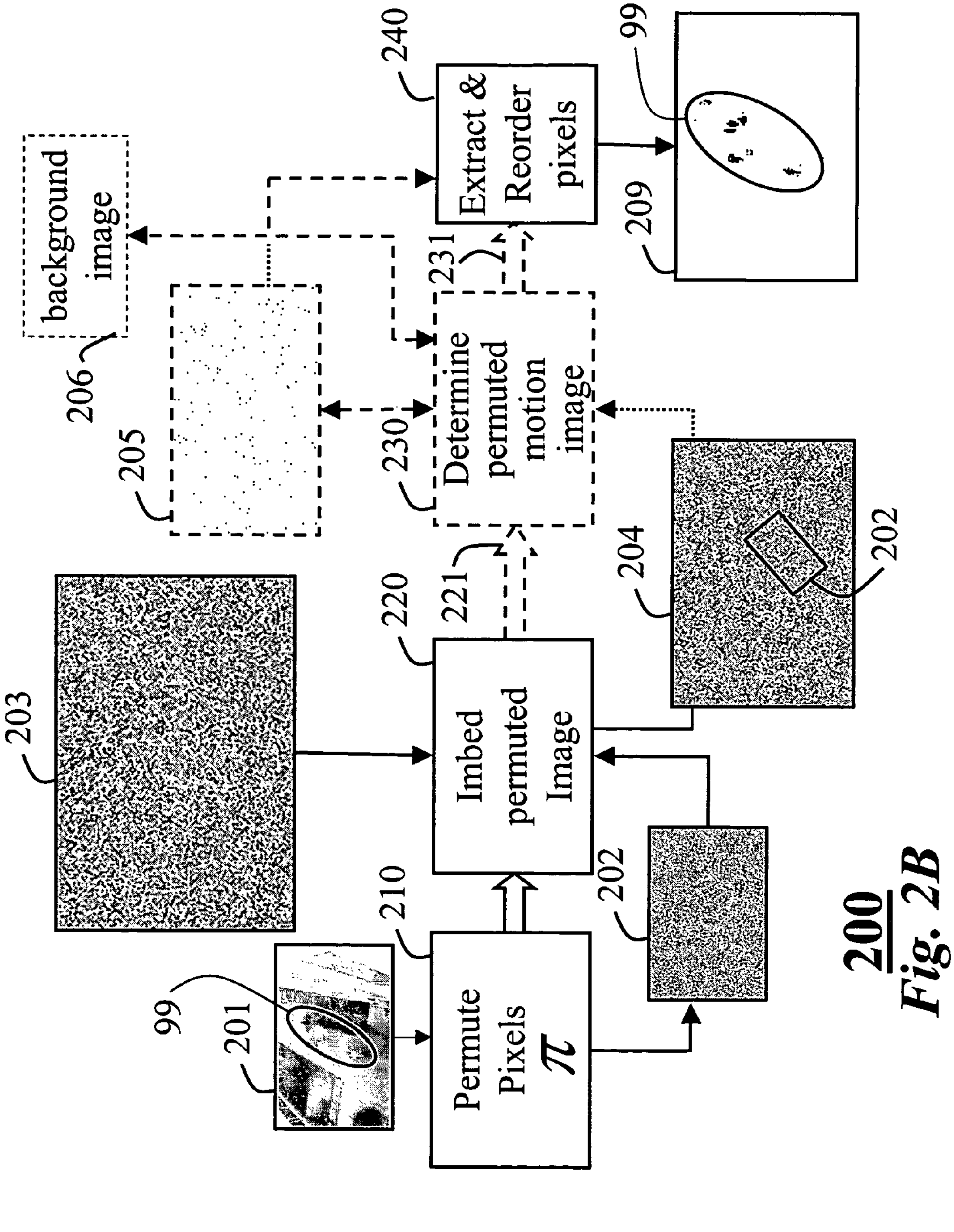
FIG. 2B is a flow diagram of secure background modeling to generate motion images according to the invention.

FIG. 2B shows the steps of the determining 200 the motion images 209. The input images of the video 201 can be acquired by a camera connected to the client computer 10. As an advantage, the client computer can have limited processing resources, e.g., the client is embedded in a cellular telephone.

The pixels in each input image I in the sequence are permuted 210 spatially, in a pseudo-random manner by the client computer using a permutation $\pi$ to generate a permuted image I' 202, such that $I'=\pi I$. Pseudo-random means that a next value cannot be determined from any previous value, but the generator can always reconstruct a particular sequence of random values, if needed, perhaps by knowing the seed value for the random number generator. Obviously, the spatial distribution of the pixels in the permuted image is random, and the original input image can be recovered by reordering using an inverse permutation $\pi^{-1}$, such that $I=\pi^{-1}I'$.

Optionally, the permuted image 202 can be imbedded in a larger random image 203 to generate an embedded image 204. The pixels in the larger random image 203 also are generated in a pseudo random manner so that an intensity histogram of the permuted image 202 is different than an intensity histogram of the larger random image. Additionally, the intensity values of the some of the pixels in the random image can be varied randomly to generate 'fake' motion in the embedded image 204. The location, size and orientation of the embedded permuted image 202 can also vary randomly for each input image.

The embedded image 204 is transferred 221 to the server computer 20 that has access to a background/foreground modeling application 230. This can be any conventional modeling application, or a proprietary process known only to the server. As an advantage, the server has substantially more processing resources than the client computer. The transfer can be via the network 30, or other means, such as portable storage media.

The application 230 at the server 20 maintains a current background image B 206. The background image can be updated from each input image or a set of previously processed permuted images. For example, the background image uses an average of the last N input images, e.g., N=10. By using a moving average, the effects of sudden changes or other short term effects in the scene are minimized. Then, a permuted motion image M' 205 is generated by combining, e.g., subtraction, the embedded image 204 from the current background image 206. If the difference between a particular input pixel and a background pixel is greater than some predetermined threshold Θ, then the input pixel is considered to be a motion pixel, and labeled accordingly. Thus, the permuted motion image 205 is $$M'=|I'-B|>\Theta.$$

The permuted motion image M' 205 is transferred 231 to the client computer. The client computer extracts the embedded portion, if necessary. Then, the pixels in the extracted portion are reordered to their original order by undoing the spatial permutation according to $M=\pi^{1}(M')$ to obtain the motion image M 209 only components related to the moving components 299, see FIG. 2C.

It should be noted that the background and the motion images can be binary or 'mask' images to greatly reduce the amount of data stored. That is, a pixel in the motion image is a '1' if the pixel is considered to be moving, and '0' otherwise. It should also noted that some of the 'motion' pixels can be erroneous due to noise. These artifacts are removed as described below.

Correctness

The process is correct because the pixel-based background subtraction does not rely on a spatial order of the pixels. Hence, permuting the order of the pixels spatially does not affect the process. Furthermore, adding fake motion pixels in the embedded image does not affect the process because there is no interaction between the fake pixels and the pixels of interest in the permuted image 202.

Security

The process is partially secure. The server can learn nothing about the content of the input images 201. The number of possible permutations is too large to determine. For example, if the input image 201 has n pixels and the embedded image is larger by a factor c=2, then the number of possible permutations is $$\binom{cn}{n},$$

where n can be a million or larger for a high resolution camera.

To 'learn' the application 230, the client needs to observe each input and output of each pixel. That is, the client analyzes a data flow between the client and the server. However, the size of the data set can make this impractical. This process does not require any 'secret' data at the server.

Complexity and Efficiency

The complexity and communication overhead of the client is linear in the size of the input images. Permuting the pixels according to a predetermined random sequence is trivial. Reordering is likewise simple. The complexity of the application 230 is not affected by the permuting.

The above process shows some of the properties of blind computer vision according to the invention. The process applies a conventional vision method to images, while hiding the content of the image from server. Although the server cannot determine the exact contents of the image, the server can learn something from the permuted image. For example, a histogram of the image can determine if the image was likely acquired during the day or night. The server can also count the number of motion pixels to determine how much motion exists in the image.

This problem can easily be overcome when the client embeds the permuted image in a large random image. This way the server cannot infer anything from the image histogram. If, in addition, the client turns on some of the random pixels to generate fake motion pixels, then the server cannot even learn if the detected motion pixels are genuine or fake.

It should be noted that the server can observe correlations between pixels over time to learn about their proximity, or to distinguish between genuine and fake motion pixels. However, the client can generate the fake motion pixels to have the same distribution as the real motion pixels.

The simplicity of the protocol is mainly due to the fact that each pixel can be treated independently, and hence, spatial order is not important.

Next, a secure vision process, such as connected component labeling, that works on regions in images is described.

Blind Component Labeling

Figure 2C:
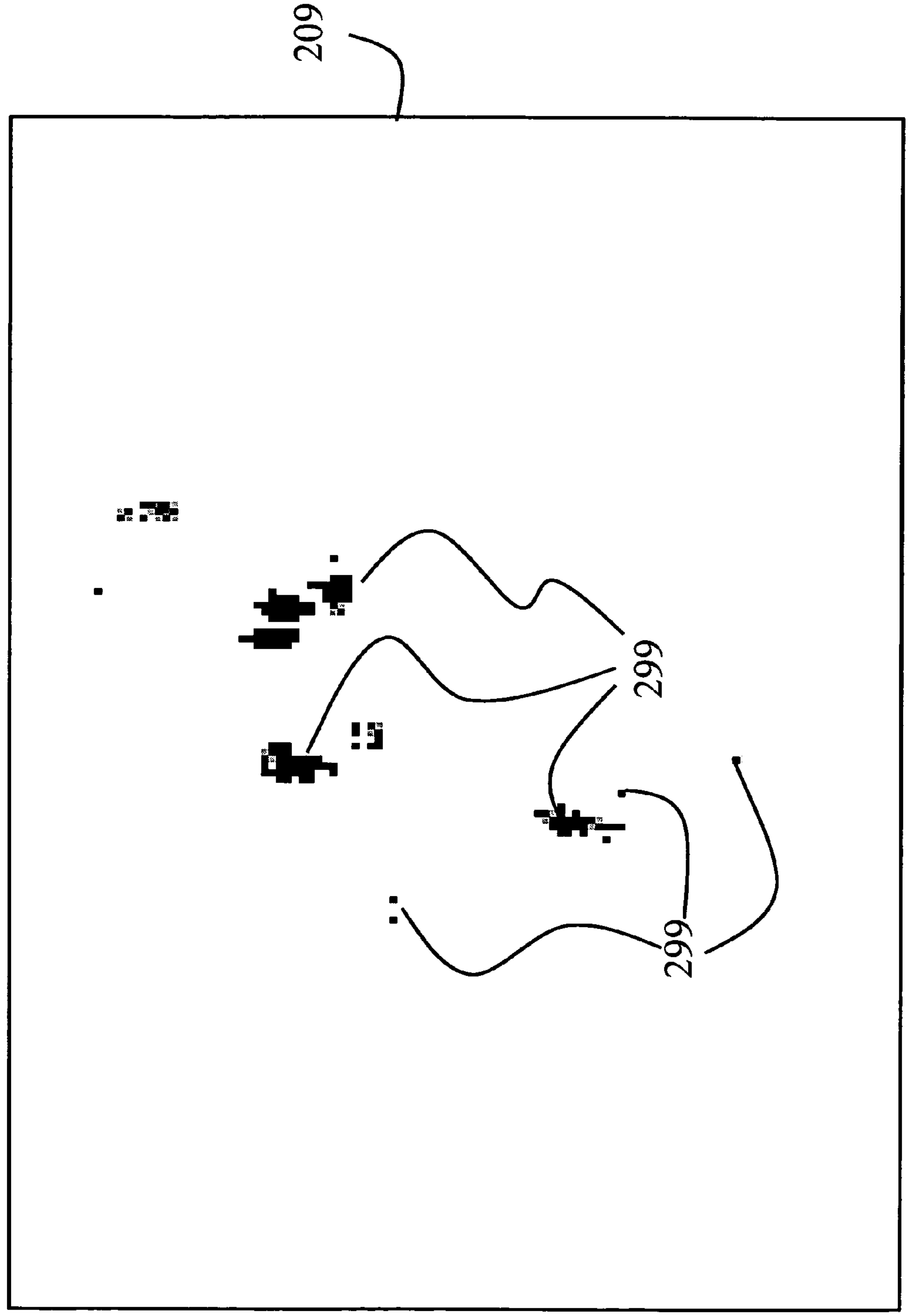
FIG. 2C is an motion image according to the invention.

In a practical application, such as object detection, object tracking, or object and pattern recognition, the motion image 209 may require further processing to remove noise and erroneous motion pixels 299, see FIG. 2C, and to 'connect' adjacent pixels that are likely associated with a single moving object. It should be noted that the input image can be any motion image.

However, further processing can depend on the spatial order of the pixels. In practice one needs to clean the motion image 209 because noise might cause some erroneous motion pixels. Unfortunately, it is no longer possible to simply to permute the pixels in the input image because the permutation will destroy the spatial arrangement of pixels in the image, and the connected component will no longer operate correctly.

An expansive process, which operates on full images, is described first, followed by a process with a reduced complexity that operates on tiles. The expansive process works by partitioning the input image into a union of random images. The random images are sent, along with some fake random images to the server. In this case, tens, or hundreds of random images can be used to ensure security. The complexity can be reduced dramatically by partitioning the input image into tiles, where each tile is treated as an independent 'image'. If the tiles are sent in a random order, then the sever is faced with a double problem to recover the input image.

Full Image Protocol

The full image protocol represents the input image as a union of random images, and send the random images, together with a large collection of random binary images to the server.

The server performs connected component labeling on each image independently, and sends the results to the client. Then, the client combine the results to obtain the final result of labeled connected components, i.e., potential objects.

The binary input image is I, e.g., image 209, and the labeled image 309 with connected components is I', i.e., image I after performing the connected component labeling. In the case there are multiple labeled images $H_1, \ldots, H_m$, where the label of the components in each image starts with, for example, one, the set of labeled images are denoted by $\overline{H}_1, \ldots, \overline{H}_m$, where each connected component has a unique label for all m images. Finally, I(q) is the value of the image I at pixel position q.

Blind Connected Components Labeling Using Full Images

Figure 3A:
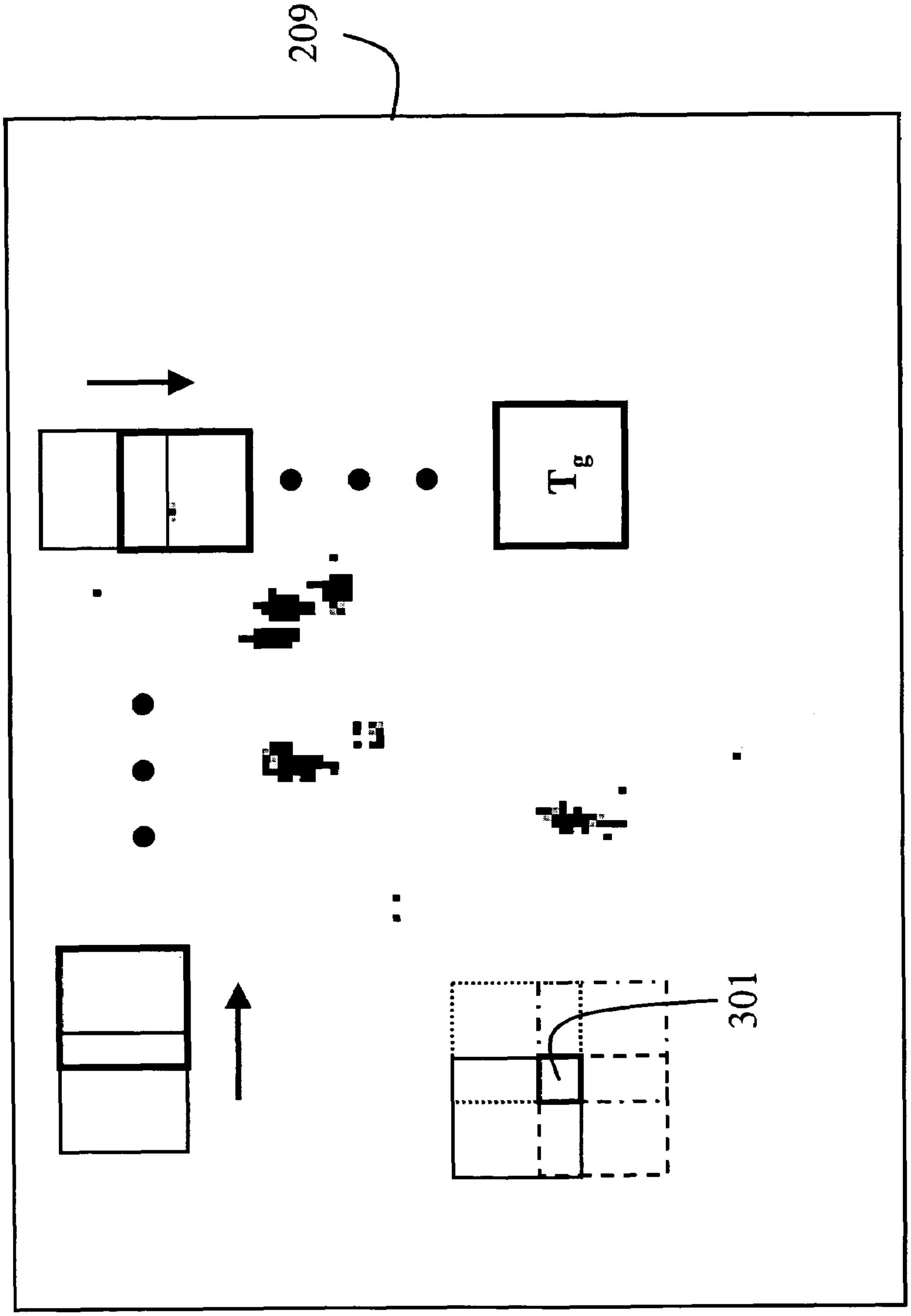
FIG. 3A is a motion image partitioned into overlapping tiles.
Figure 3B:
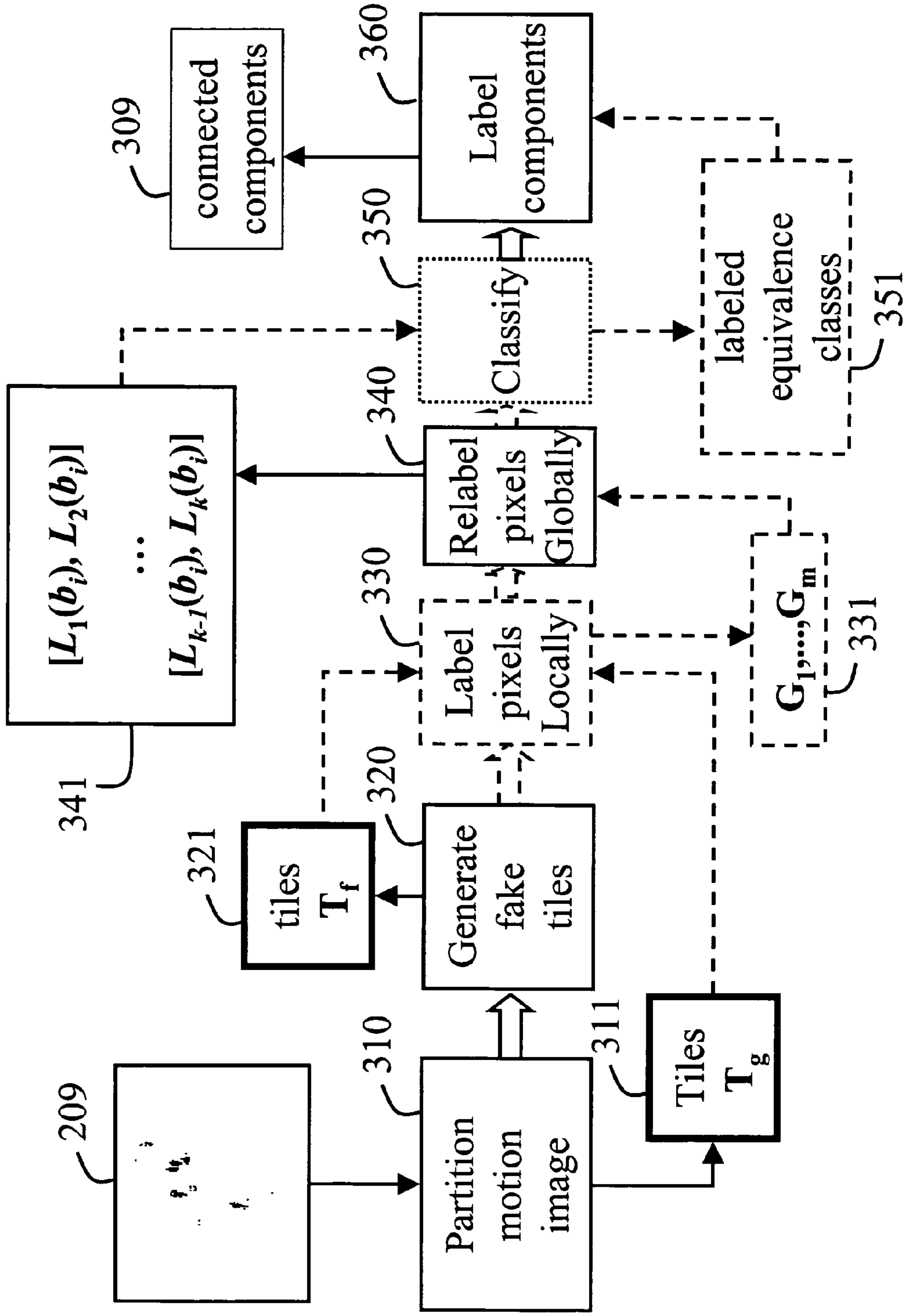
FIG. 3B is a flow diagram of secure component labeling using tiles according to the invention.
Figure 3C:
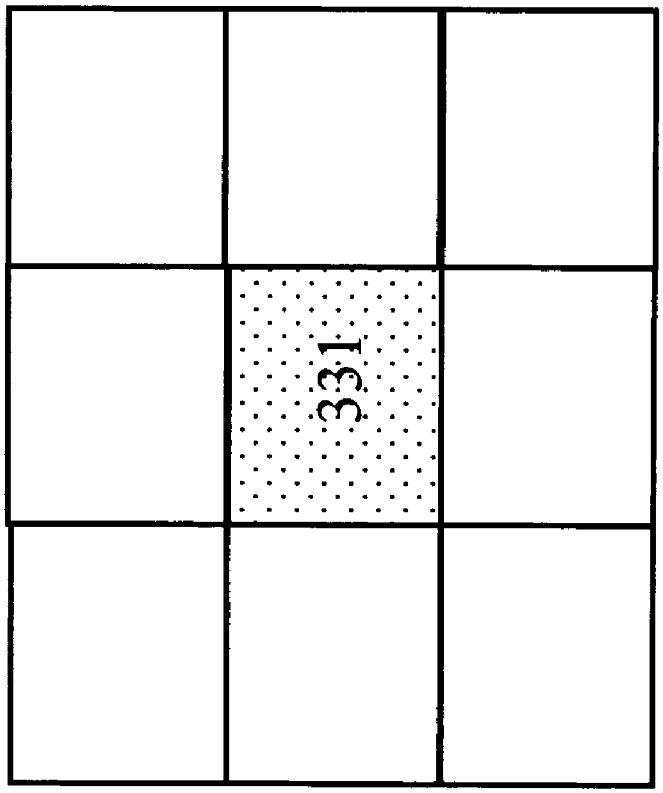
FIG. 3C is a 3×3 tile of a motion image according to the invention.
Figure 3D:
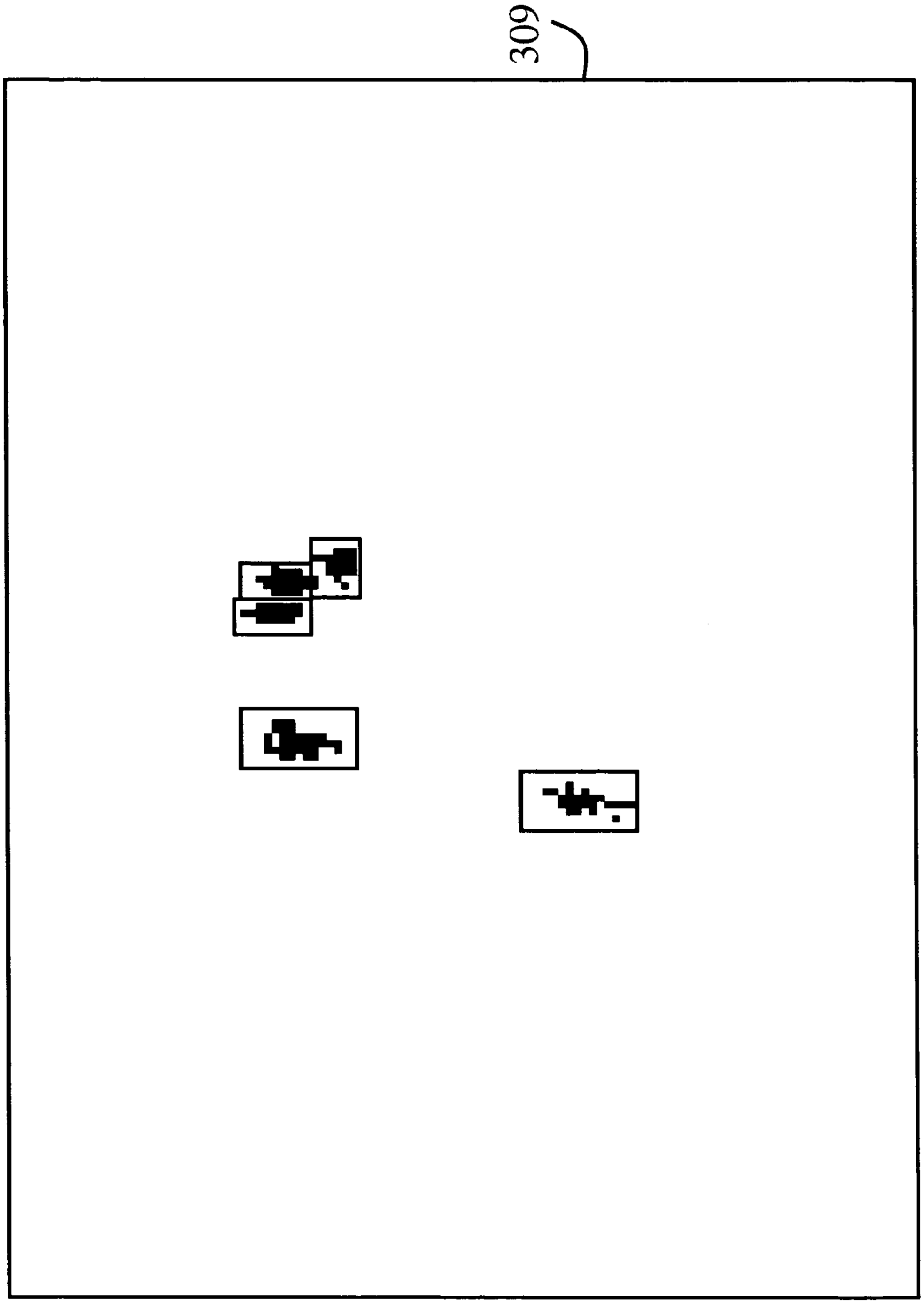
FIG. 3D is a motion image with connected components according to the invention.
Figure 3E:
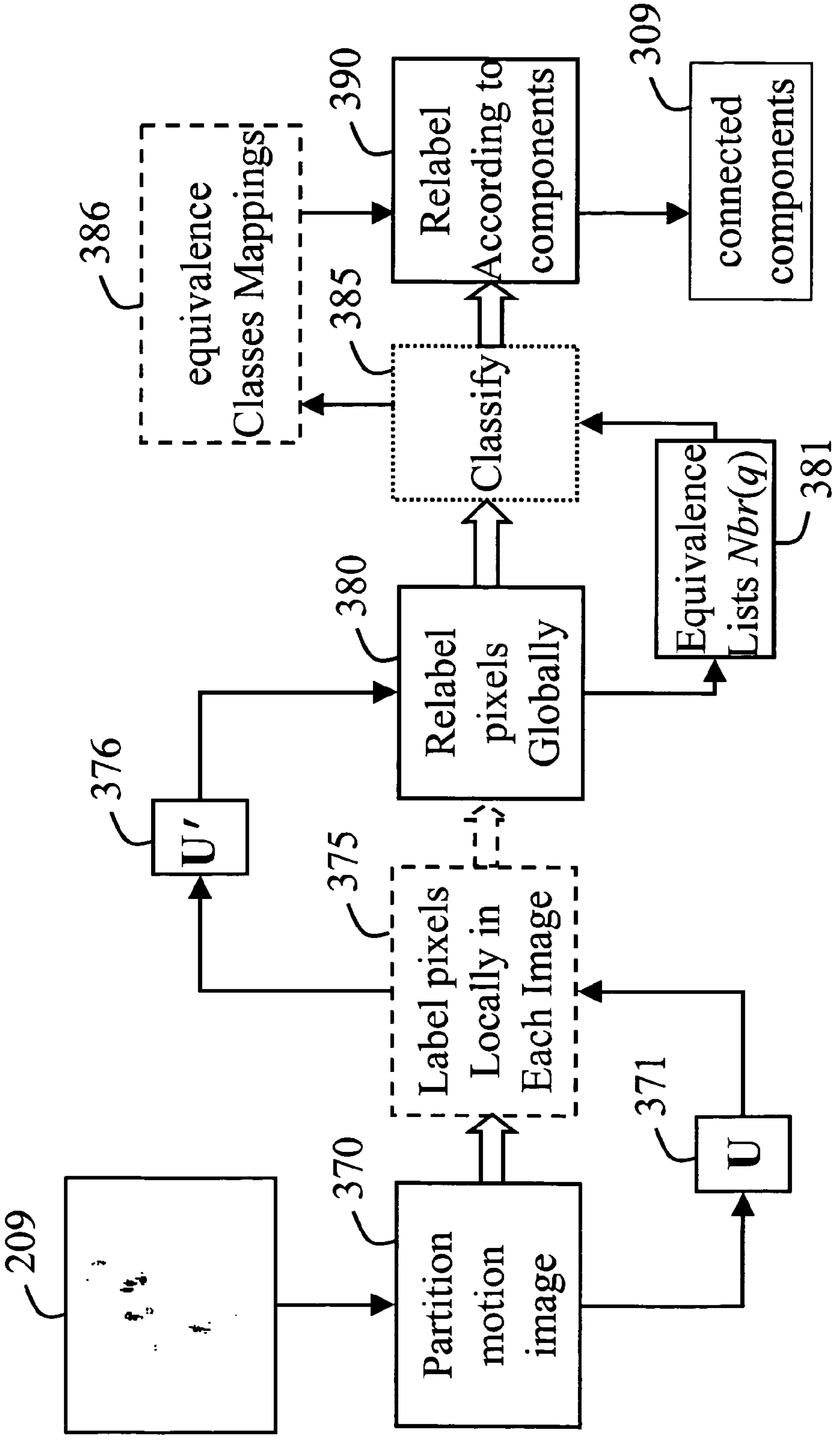
FIG. 3E is a flow diagram of a secure component labeling using full images according to the invention

As shown in FIG. 3E, the server has an input image I 209, and the server has a connected component labeling process 300. The output of the process is a labeled connected component image $\bar{I}$. The server learns nothing about input image I.

To begin, the client generates 370 m random images $H_1, \ldots, H_m$, such that $$I=\cup_{i=1}^{m} H_i.$$

The client sends r>m random images $U_1, \ldots, U_r$ 371 to the server, where for secret $j_1, \ldots, j_m$ images, $U_{ji}=H_i$, where the additional images are fake images.

The server determines 375 connected component labeling for each image U, and sends labeled images $U_1', \ldots, U_r'$ 376 to the client.

The client relabels 380 images $H_1', \ldots, H_m'$ with a unique labels globally across all labeled images and denotes these images by $\overline{H}'_1, \ldots, \overline{H}'_m$. For each pixel q, such that I(q)=1, let $\overline{H}'_1(q), \ldots, \overline{H}'_m(q)$ represent different labels of each image. Then, the client generates an equivalence list $\{\overline{H}'_i(Nbr(q))\}_{i.\ 1}^{m}$ from the globally labeled images, where Nbr(q)is a list of four or eight neighboring pixels of each pixel q. Pixels are connected only if the pixels are motion pixels and the pixels are immediately adjacent to each other.

The server scans the equivalence label lists 381, determines 385 equivalence classes, and returns a mapping 386 from every label to the equivalence class representative.

The client relabels 390 each image $\overline{H}_1'$ according to the mapping returned by the server and determines the final result: for every pixel q, $\overline{I}(q)=\max(\{\overline{H}_i'(q)\}_{i.\ 1}^{m}$, which forms the final image 309 of connected components.

Correctness

The protocol is correct because each image $H_i$ is correctly labeled by the server process. Furthermore, because $I=\cup_{i=1}^{m} H_i$, it follows that each image $H_i$ contains only part of the motion or 'on' pixels of the input image I, and hence, no spurious 'on' pixels are added that might connect two regions that are not connected in the original image I.

Each connected component in the original image I can be broken into several components across the multiple random images $H_i$, hence, the same component can have multiple labels. However, the final client relabeling step, which calculates a single representative for every equivalence class, takes care of this. The relabeling also ensures that there is only one label, or none at all, for every motion pixel in all of the random images.

Security

The protocol is secure because the client sends the server multiple binary images U of which only the subset H form the input image. For a suitable r and m, the number of possibilities $$\binom{r}{m}$$

can be too prohibitively large to determine. In the second stage, the client sends a list of equivalence lists 381. Because the client has already relabeled the components, the server cannot associate the new labels with the original images, and the client is secured. The server does not need to store any private data that need to be secured.

Complexity and Efficiency

The complexity is linear according to r. For each random image, the server performs the connected-component labeling. The client generates m random images whose union is I, and the additional r−m fake random images.

The above process is secure if $$\binom{r}{m}$$

is large. For example, if r=128, and m=64, then there are $$\binom{128}{64} \approx 2^{124}$$

possibilities to check.

Blind Connected Components Labeling Using Tiles

In this case, as shown in FIGS. 3A-C, the client partitions 310 each motion image 209 into a set of overlapping tiles genuine $T_g$ 311 of pixels. For clarity, the tiles are shown not to scale. For, example, the tiles are 3×3 pixels, with one pixel overlap at the top and bottom, and side to side. It should be noted, that other tiles sizes and overlaps could be used. However, as the tiles are made larger, it becomes easier to determine the content. In addition, the client can optionally generate 320 fake tiles $T_f$ 321 of pixels.

The genuine tiles 311 and the fake tiles 321 are transferred to the server in a pseudo random order. The server locally labels 330 motion pixels in each tile that are 'connected' to other motions pixels. A pixel is said to be connected when the pixel is adjacent to at least one other motion pixel. For example, the label $G_1$ is given to each pixel of a first group of pixels that are connected in a particular tile, and the label $G_2$ is given to each pixel in a second group of connected pixels in the same tile, and so forth. For each tile, the labels start over again with $G_1$. That is the first and second groups in another tile are also labeled $G_1$ and $G_2$. Hence, the labels 331 are locally unique to each tile.

As shown in FIG. 3C for a 3×3 tile, a motion pixel (stippled) 301 can have at most eight adjacent motion pixels. Note, the server does not know that some of the tiles are fake, nor the random spatial ordering of the tiles. Single unconnected pixels and non-motion pixels are not labeled. The server can use a conventional or proprietary process for determining the connectivity of motion pixels.

The labeled tiles 331 are transferred to the client. The client discards the fake tiles, reconstructs the motion image with connected pixels labeled locally. The client relabels 'border' pixels with globally unique labels. The unique labels can also be generated in a pseudo-random manner. The border pixels are the four or eight outside pixels on a tile. Because of the one-pixel overlap, a border pixel can appear in two adjacent tiles with the same or different global labels as determined by the server.

In fact as shown in FIG. 3A, a corner pixel 301 in a tile can have up to four different labels assigned by the server. The client can determine if two border pixels on adjacent tiles that received two different labels by the server are in fact the identical pixel, and can therefore be associated with a unique global label. The relabeling 340 generates a list 341 of pairs of unique and local labels $[L_1(b_i), L_2(b_i)], \ldots, [L_{k-1}(b_i), L_k(b_i)]$.

The client transfers the list 341 to the server in yet another pseudo-random order. The server classifies 350 the pairs into equivalence classes 351, using conventional or proprietary classification techniques. The server assigns its own unique label to each equivalence classes 351.

The labeled equivalence classes 351 are transferred to the client. The client uses these labels to relabel 360 the pixels with a unique global label for each set of connected pixels, which form the connected components 309, see FIG. 3D.

Correctness

The process is correct because each tile is correctly labeled locally by the server. Connected pixels that are spread across multiple tiles are correctly merged by the client because there is an overlap between the tiles. The equivalence class determination 350 ensures that each group of connected pixels is assigned a unique label.

Security

The process is secure for p genuine tiles and m fake tiles, because the number of different possibilities is very large $$\binom{pm}{m}.$$

The value m for a 320×240 image is about 20,000 tiles. If one hundred fake tiles are added, the number of permuted possibilities is approximately $O(2^{1400})$. Even if the server can detect genuine tiles, the correct spatial order of the tiles remains unknown, because tile histograms for many different images will appear identical. The random ordering of the pairs 341 with respect to the random ordering of the tiles 311, 321 also makes it extremely difficult to analyze the content by the sever.

Complexity and Efficiency

Again, the complexity of the process at the client is linear with respect to the size of the image. Converting images to tiles is straight forward.

Blind Object Detection

Figure 4A:
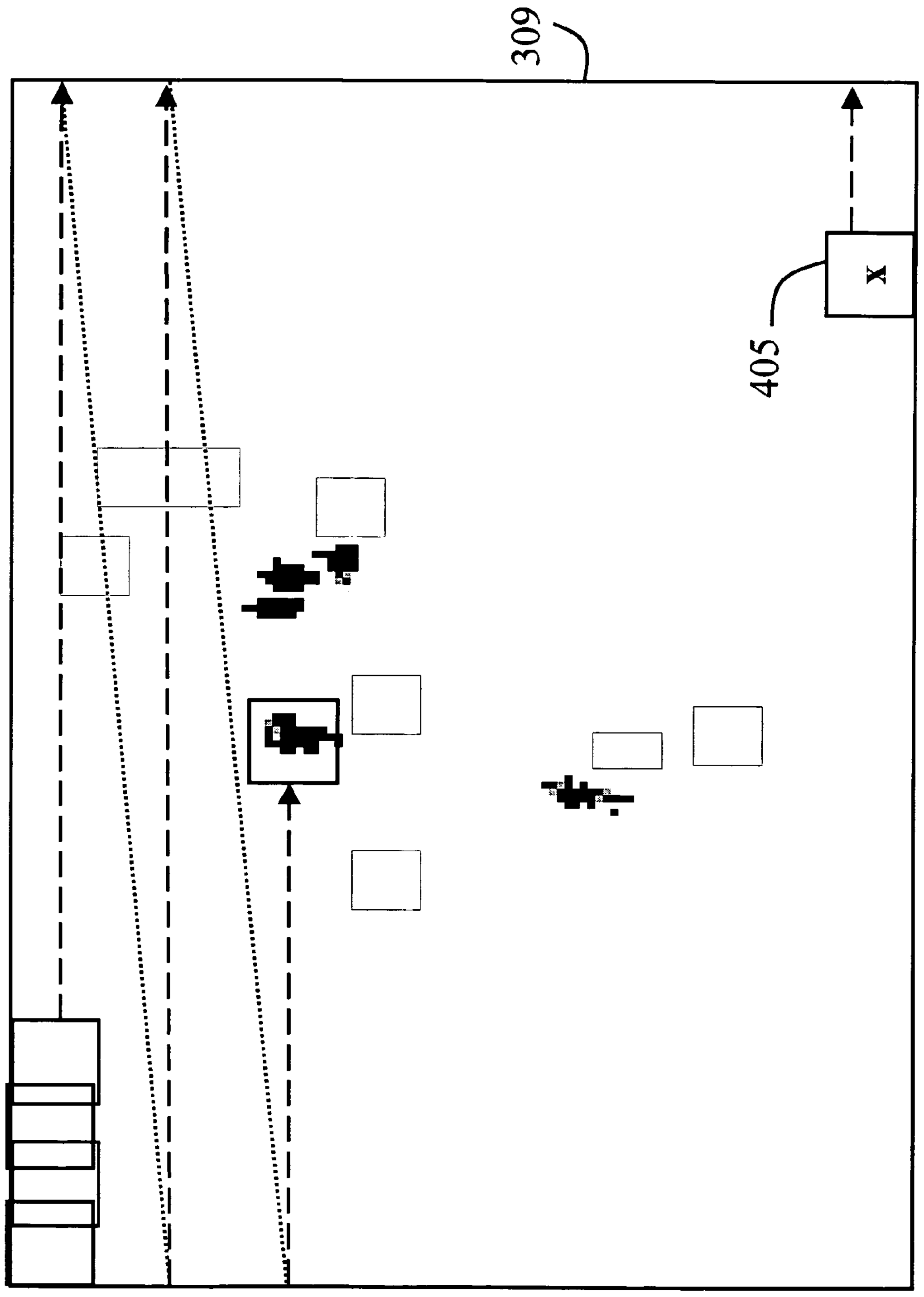
FIG. 4A is a motion image including object to be detected securely using a scanning window according to the invention.

The final process 400 is object detection. Object detection scans the image 309 of connected components with a sliding window 405 in a raster scan order, as shown in FIG. 4A. At each location of the sliding window, a determination is made whether the content of the sliding window includes an object, or not.

Many classifiers, such as neural networks, support vector machines, or AdaBoost can be represented as additive models, or sum of kernel functions, e.g. a radial basis function, polynomial function, or sigmoid function. These functions work on the dot product of the window and some prototype patterns determined during a prepossessing training phase.

There is a natural tension between zero-knowledge methods and machine learning techniques in that the first tries to hide while the second tries to infer. In the method according to the invention, the client uses the server to label training images for the client, so that the client can later use the training images to train its own classifier.

In the following, the client has an input image I 401, and the server has a weak classifier of the form a convolution kernel $\alpha f(x^T y)$, where x is the content of the window, y is the weak classifier, $f$ is a non-linear function, and $\alpha$ is a coefficient. Hence, it is sufficient to describe how to apply a convolution operation on the image I, and then to pass the result to the classifier.

The weak classification is based on the result of convolving the image with some filter and then passing the result through some non-linear function. For example, a rectangular filter is used as described by P. Viola and M. Jones, "*Rapid Object Detection using a Boosted Cascade of Simple Features*," IEEE Conference on Computer Vision and Pattern Recognition, Hawaii, 2001, incorporated herein by reference. For each image position, determine the dot-product between a sliding window and the rectangular filters. The result of the convolution operation is passed through a non-linear function, such as AdaBoost, or a kernel function in a Support Vector Machine, or a sigmoid function in neural-networks.

To summarize, the weak classifier has three components: a non-linear function $f(\ )$, which can be Gaussian, sigmoid, etc, a weight (alpha) and a convolution kernel y. The image is first convolved with the convolution kernel y, and the result is stored as a convolved image. Each pixel in the convolved image contains the result of convolving the kernel y with a window centered at that pixel. The pixels in the convolved image are passed through the non-linear function $f(\ )$ and multiplied by alpha.

Zero-knowledge protocols can often be classified as encryption based or algebraic based protocols. In encryption based protocols, the parties encrypt data using standard techniques, such as public-private-key encryption and, as a result, no information is available to other parties. This comes at a high computational and communication cost to be avoided.

Alternatively, one can use an to algebraic protocols that are faster to compute but might reveal some information. Algebraic methods hide a vector by working on sub-spaces. For example, if one party has a vector $x \in R^{400}$, then after performing the protocol, the other party knows that x lies in some low-dimensional subspace, e.g., a ten-dimensional subspace, within the original 400-dimensional space.

In one embodiment of the blind object detection process 400, only the security of the client is maintained. Variants of this protocol can be useful in applications where the client needs to use the server to perform conventional convolutions, such as edge detections or low-pass filter on the input image I, without revealing the content of the image to the server. This process can be extended to protect the security of the server as well, as described below.

Blind Convolution

Figure 4B:
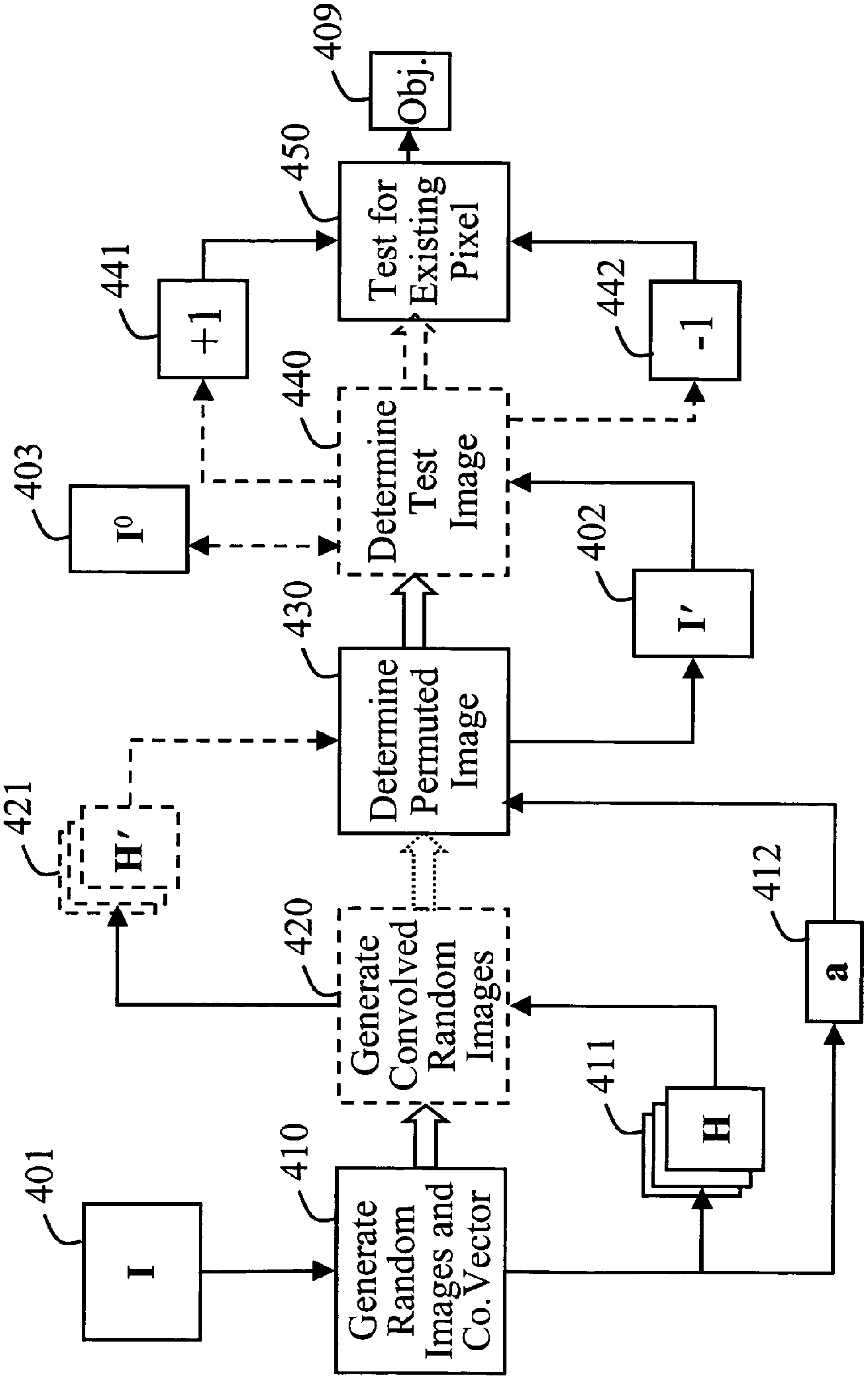
FIG. 4B is a flow diagram of a first object detection method according to the invention.

As shown in FIG. 4B, the client has an input image I 401, e.g., the image 309 with connected components, in which an object is to be detected. The server has a convolution kernel y that is applied to the input image to generate a convolved image I' with pixels associated with an object marked.

In greater detail, the client generates 410 m random images, $H_1, \ldots, H_m$, 411, and a coefficient vector, $a=[\alpha^1, \ldots, \alpha_m]$, 412, such that the input image I 401 is $I=\cup_{i=1}^{m} H_j$.

The random image $H_i$ forms a sub-space that contains the original image I. For example, if m=10, then nine images that are different than the original image I are acquired. For example, the nine images are random nature or street scenes. The nine images and the original image form a sub-space that, in particular, contains the image I. Each image $H_i$ is set to be a linear combination of these images. This way each image $H_i$ looks like a meaningless image, even though it is expressed as a linear combination of all the $H_i$ images.

The client sends the random images 411 to the server.

The server determines 420 m convolved random mages H' 421, such that $\{H_1'=\pi_1(H_1 * y\}_{i.\ 1}^{m}$, where * is the convolution operator, and $\pi_1$ is a first random pixel permutation. The server sends the m convolved images $\{H_i'\}_{i.\ 1}^{m}$ 421 to the client. Here, the operator * convolves every window in the image $H_i$ with the convolution kernel y. This can be expressed as H'=H*y, where y is, e.g., a Gaussian kernel, and * is the convolution operator.

The client determines 430 a permuted image I'402, such that $I'=\pi_2\ (\Sigma_{i=1}^{m} \alpha_i H'_i)$, where $\pi_2$ is a second random pixel permutation. The client sends the permuted image I' 402 to the server.

The server determines 440 a test image $\bar{I}$ 403, such that $\bar{I}=\alpha f(I')$.

The server returns 'true' (+1) 441 to the client if there exist a pixel q in the test image such that $\bar{I}(q)>0$, otherwise the server returns 'false (−1) 442, to indicate whether or not the image contains an object.

The client can then test 450 for the existing pixels q to determine whether there is an object 409 in the input image.

Correctness

The protocol is correct because the sum of the convolved images is equivalent to the convolution of the sum of images. The two random permutations $\pi_1$ and $\pi_2$ guarantee that neither party has a mapping from the input to the output. Hence, neither party can form a set of constraints to decrypt the information of the other party.

However, the client has an advantage. If the input image I 401 is all black with a white pixel, then the client can analyze the images $H_1'$ 421 to learn the values of the convolution kernel y. This problem can be fixed by the following protocol.

Blind, Location Free, Object Detection

The process detects whether an object appears in the image or not, but does not reveal the location of the object. This process can be extended to detect the location of the object as well.

Figure 4C:
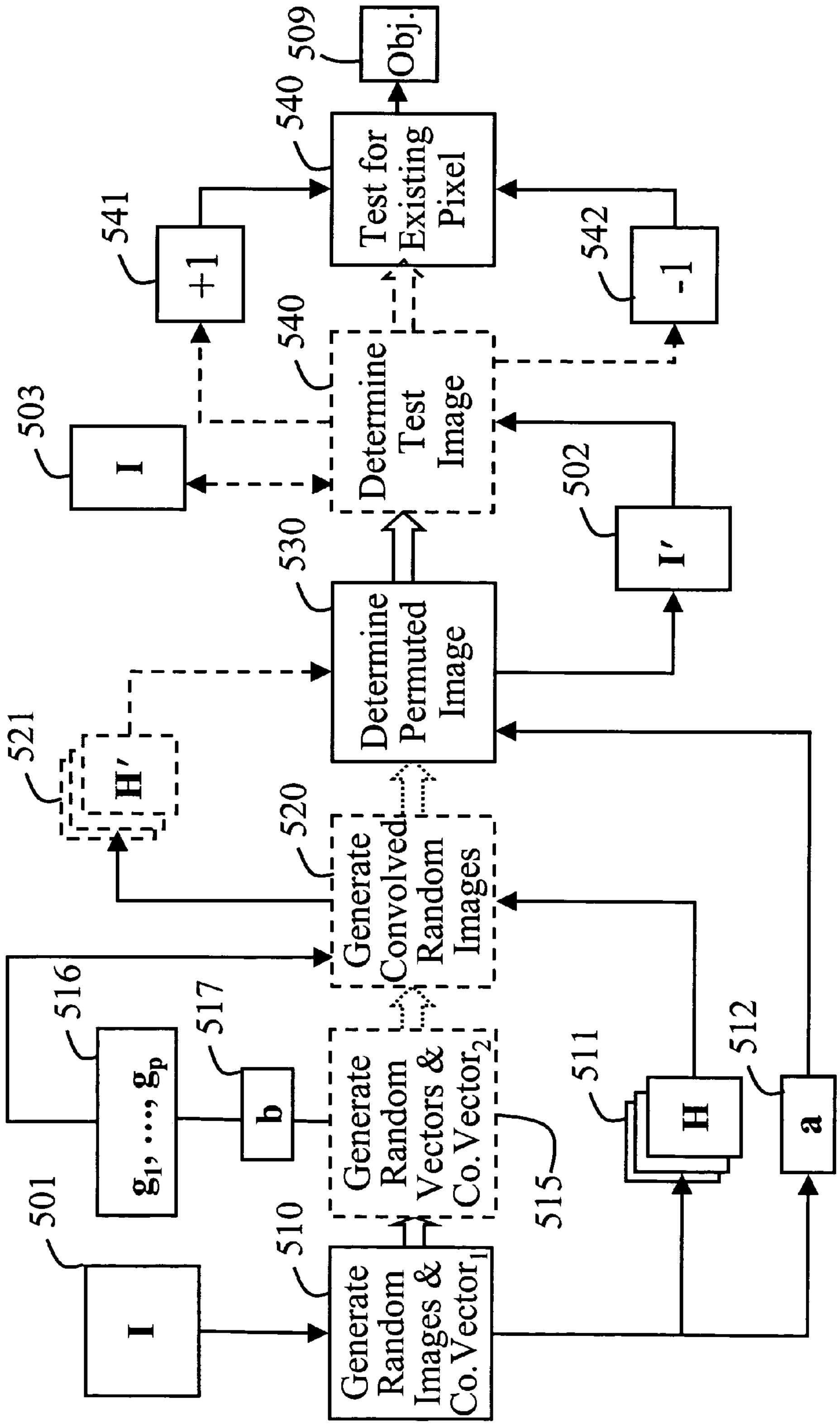
FIG. 4C is a flow diagram of a second object detection method according to the invention.

As shown in FIG. 4C, the client has an input image I 501, and the server has a weak classifier of the form $\alpha f(x^T y)$. The server detects an object in the input image, but not the location of the object. The server learns nothing about the image I.

The client generates 510 m random images, $H_1, \ldots, H_m$, 511, and a coefficient vector, $a=[\alpha_1, \ldots, \alpha_m]$, 512 such that $I=\Sigma_{i=1}^m \alpha_i H_j$.

The server generates 515 p random vectors, $g_1, \ldots, g_p$, 516, and a second coefficient vector, $b=[b_1, \ldots, b_p]$, 517 such that $y=\Sigma_{j=1}^p b_j g_j$.

The client sends the random images 511 to the server.

The server determines 520 mp convolved images $H'_{ij}$ 521, such that $\{\{H'_{ij}=\pi_1(H_i * g_j)\}_{j=1}^p\}_{i=1}^m$, where * is the convolution operator, and $\pi_1$ is the first random pixel permutation. The convolved images $\{\{H'_{ij}\}_{j=1}^p\}_{i=1}^m$ 521 are sent to the client.

The client determines 530 permuted images $I'_j$ 502, such that $\{I'_j=\pi_2(\Sigma_{i=1}^m \alpha_i H'_{ij})\}_{j=1}^p$, where $\pi_2$ is the second random pixel permutation. The client sends the permuted images 502 to the server.

The client determines 540 intermediate images $I''=\Sigma_{j=1}^p b_j I'_j$, and a test image $\bar{I}$ 503, such that $\bar{I}=\alpha f(I'')$.

The server returns 'true' (+1) 541 to the client if there exist a pixel q in the test image such that $\bar{I}(q)>0$, otherwise the server returns 'false' (−1) 542.

The client can then test 550 for the existing pixels q to determine whether there is an object 509 in the input image.

Correctness

This protocol is correct because the convolution of a sum of images is equal to the sum of convolved images. Formally, it can be shown that I*y=I''. If $\pi_1$ and $\pi_2$ are identity permutations, then the following derived equations hold:

$$I * y = \sum_{i=1}^{m} a_i H_i * y \tag{1}$$

$$= \sum_{i=1}^{m} a_i H_i * \sum_{j=1}^{p} b_j g_j \tag{2}$$

$$= \sum_{i=1}^{m} a_i \sum_{j=1}^{p} b_j H_i * g_j \tag{3}$$

$$= \sum_{i=1}^{m} a_i \sum_{j=1}^{p} b_j H'_{ij} \tag{4}$$

$$= \sum_{j=1}^{p} b_j \sum_{i=1}^{m} a_i H'_{ij} \tag{5}$$

-continued $$= \sum_{j=1}^{p} b_j I'_j \tag{6}$$

$$= I'' \tag{7}$$

Note that even if $\pi_1$ and $\pi_2$ are random permutations, the above derivations are not affected. Thus, the protocol is correct.

Security

The protocol is secure, and the security is governed by m and p that define a rank of the subspaces in which the image and classifier are defined, respectively. It can be demonstrated that the process is secure.

The server knows that the m random image 512 sent by the client are a linear combination of the input random 501. images 411. Increasing the size of m increases the security for the client.

In step 530, the client sends p images 502 to the client. If the client does not use the second permutation $\pi_2$, then the server could determine images $I'_j$ and $H'_{ij}$, and the only unknowns are the coefficients $\alpha_i$, which can be recovered in a least-squares manner. However, the second permutation $\pi_2$ forces the server to select, for any given j, the correct mapping from pixels in the random $H_{ij}$ 511 images and the permuted image $I'_j$. This is equivalent to selecting one out of options $$\binom{n}{m},$$

where n is the number of pixels in the image. For example, for n=320*240=76800 and m=20, there are $$\binom{76800}{20}$$

possible selections.

In step 520, the client sends mp convolved images 521 to the client. If the client sets the image $H_1$ to be a black image with only one white pixel, then the client can recover the values of $g_j$, for every j. However, the client does not know the coefficients $b_j$, and hence, cannot recover the classifier y.

In step 540, the client only returns a true or no false [+1, −1] to the client indicating whether there is an object in the image, or not. Hence, the client cannot learn the coefficients $b_j$ in this step.

Complexity and Efficiency

The protocol is linear according to mp, respectively, the number of random images and vectors that are used to represent the input image I 501 and the classifier y.

The process can be extended to locate the object in the input image by recursively applying the process to sub-images using a binary search. If the object is detected in the image, then partition the image into two halves or four quadrants, and apply the process to each sub-image to narrow down the exact location of the object. The partitioning can be repeated as necessary. This way, the client can send multiple fake images to the server. Then, the server cannot determine whether a detected object is genuine or fake.

EFFECT OF THE INVENTION

The invention applies zero-knowledge techniques to image processing methods. By utilizing domain-specific knowledge, the invention can greatly accelerate such processing and yield practical solutions to problems of secure multi-party computations involving images and videos.

A number of processes are described for blind computer vision, in particular blind background modeling, blind connected component labeling, and blind object detection. Combining the various processes can result in a practical blind computer vision system.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for processing a sequence of input images securely, comprising:

acquiring, in a client, a sequence of input images, each input image including pixels;

permuting randomly, in the client, the pixels in each input image according to a permutation $\pi$ to generate a permuted image for each input image;

transferring each permuted image to a server;

maintaining, in the server, a background image from the permuted images;

combining, in the server, each permuted image with the background image to generate a corresponding permuted motion image for each permuted image;

transferring each permuted motion image to the client; and reordering, in the client, the pixels in each permuted motion image according to an inverse permutation $\pi^{-1}$ to recover a corresponding motion image for each input image.

2. The method of claim 1, further comprising:

generating, for each input image, a random image that is larger than the input image;

embedding, after performing the permuting, each input image in the random image to generate the permuted image.

3. The method of claim 1, in which the permuting is a pseudo-random spatial rearrangement of the pixels in each input image.

4. The method of claim 2, in which an intensity histogram of the permuted image is different than an intensity histogram of the larger random image.

5. The method of claim 2, in which intensity values of the pixels in the larger random image are varied randomly.

6. The method of claim 2, in which a location of the embedding varies randomly.

7. The method of claim 2, in which a size of the embedding varies randomly.

8. The method of claim 2, in which an orientation of the embedding varies randomly.

9. The method of claim 1, in which the maintaining further comprises:

averaging a set of previously processed permuted images to maintain the background image.

10. The method of claim 1, in which the combining subtracts the background image from the permuted image to determine a difference for each pixel.

11. The method of claim 10, in which the pixel is labeled a motion pixel if the difference is greater than a predetermined threshold.

12. The method of claim 1, in which the motion images and the background image are binary images.

13. The method of claim 1, further comprising:

removing noise from the motion image.

14. A method for processing a sequence of input images, comprising:

permuting randomly the pixels in each input image to generate a permuted image for each input image;

maintaining a background image from the permuted images;

combining each permuted image with the background image to generate a corresponding permuted motion image for each permuted image; and reordering the pixels in each permuted motion image to recover a corresponding motion image for each input image.

15. A system for processing a sequence of images securely, comprising:

a client configured to acquire a sequence of input images, each input image including pixels, the client further comprising:

means for permuting randomly the pixels in each input image according to a permutation $\pi$ to generate a permuted image for each input image; and means for reordering pixels in permuted motion images according to an inverse permutation $\pi^{-1}$ to recover a corresponding motion image for each input image; and a server configured to maintain a background image from the permuted images, the server further comprising:

means for combining each permuted image with the background image to generate the corresponding permuted motion images for each permuted image.

* * * * *